United States Patent Office 2,811,434
Patented Oct. 29, 1957

2,811,434

PROCESS FOR TREATING ILMENITE-CONTAINING MATERIALS TO PRODUCE METALLIC IRON CONCENTRATES AND TITANIUM DIOXIDE CONCENTRATES

Olav Möklebust, Hauge i Dalane, Norway, assignor to National Lead Company, New York, N. Y., a corporation of New Jersey No Drawing. Application December 21, 1954, Serial No. 476,843

9 Claims. (Cl. 75—30)

The present invention is concerned with improvements in the process for treating ilmenite-containing materials and more particularly with the preparation of metallic iron concentrates and titanium dioxide concentrates from ilmenite ores or concentrates.

While ilmenite-containing materials are widely distributed in nature, pure ilmenite (i. e., ferrous titanate having the chemical formula $FeO.TiO_2$ or $FeTiO_3$) is seldom found in any quantity in nature, since in most instances other occluded iron oxides, such as hematite and/or magnetite, and gangue constituents are present in the ore. It is possible by well known mineral dressing techniques to remove most of the discrete particles of hematite and magnetite from these ilmenite ores but inasmuch as the iron values in ilmenite, viz. ferrous titanate, are molecularly bound with the titanium values these same techniques will not suffice to separate the iron values from the titanium values to produce $TiO_2$ concentrates.

Many processes for separating the iron and titanium values in ilmenite ores and concentrates have been suggested. One such process relates to smelting an ilmenite ore in the presence of a reducing agent and one or more slag-forming substances such as soda or lime, whereby the iron values are separated out at the bottom of the reduction furnace as molten metallic iron and the titanium values, as $TiO_2$, collect in the molten slag.

Also, it is known to reduce titaniferous magnetites, whose principal content is $Fe_3O_4$, by sintering the ore with carbon and 30–40% by weight of soda ash, and at temperatures no higher than 1080° C. However, such large additions of the slag-forming agent are undesirable not only because they are expensive but also because they contaminate the final titanium dioxide concentrate.

Still another method proposes reducing the iron values of an ilmenite ore to metallic iron by sintering and then extracting the metallic iron from the titanium values by dissolving the metallic iron in acid.

Each of these procedures is subject to various difficulties and disadvantages. Where the process is based upon separation of molten metallic iron from molten titanium-bearing slag, exceptionally high temperatures are required. Further, the necessary addition of large quantities of slag-forming agents is undesirable since these agents inhibit recovery of the titanium values in the slag as titanium dioxide. Also, obvious economic disadvantages accrue in a procedure wherein the metallic iron in the sintered material is recovered by dissolving the iron in acid.

An object of the present invention therefore is to provide an improved method for forming and recovering a substantially iron-free titanium oxide concentrate from ilmenite ores or concentrates. A further object is to provide an improved method for separating and recovering the iron values from ilmenite ores or concentrates as metallic iron. Another object is to separate and recover the iron values from the titanium values in an ilmenite-containing material by a low temperature process. Still another object of the invention is to provide a simple and improved method of smelting ilmenite-containing materials by controlling the viscosity of the slag such that the iron values in the individual ilmenite ore particles will coalesce to form beads of metallic iron, but without melting the ilmenite ore particles or causing the surfaces thereof to become sticky so as to fuse with the slag. These and other objects will become more apparent from the following more complete description of the invention.

In its more general aspects the present invention comprises admixing ilmenite-containing materials with a small amount of a slag-forming compound, such as, for example, one or more sodium compounds which form $Na_2O$ upon heating in a reducing atmosphere, agglomerating the admixture, then heating the admixture to a temperature between 1150° and 1200° C. in the presence of a solid carbonaceous reducing agent so as to reduce and coalesce the iron values, including the chemically combined iron values in the ilmenite particles, to form metallic iron beads, and thereafter separating the metallic iron beads from the titanium values by comminution and magnetic or gravimetric means.

More particularly the process of the present invention is directed to reducing the iron values in the individual ilmenite grains or particles of an ilmenite-containing ore or concentrate to form small metallic beads. To accomplish this, relatively small quantities of a slag-forming compound are added to the ore or concentrate to combine with the $TiO_2$ therein and form a slag of such viscosity that the metallic iron produced by reduction of the molecular iron and iron oxides in the individual ilmenite grains will coalesce to form metallic iron beads of such size that upon crushing the slag the iron beads can be removed from the slag by magnetic separation or washing. However, while it is necessary that the viscosity of the slag within the individual ilmenite ore particles be sufficiently low to permit the metallic iron from the individual reduced particles of ilmenite to mass together and form beads, it is also essential that the viscosity of the slag not be so low that the surface of the individual grains of ore become sticky, or that they should melt. In accordance with the present invention it has been found that reduction of the ilmenite ore particles should be carried out at temperatures between about 1150° C. and about 1200° C., and preferably at about 1180° C.

Since it is highly desirable to avoid fusion of the slag on the ilmenite grain surfaces, best results are obtained when the charge is heated to temperatures within the range of from about 1150°–1200° C. At temperatures above about 1200° C. the entire charge will usually sinter or melt with the result that the ore, excess coke, ashes and gangue constituents will agglomerate into a compact mass thereby adversely affecting recovery of the metallic iron and titanium oxide concentrates. On the other hand, temperatures at least as high as 1150° C. are desirable in order to produce a slag of sufficiently low viscosity to allow the metallic iron formed by reduction of the iron values in the individual particles of ilmenite ore to flow together and form separable beads of metallic iron.

As mentioned at the outset the ilmenite-containing material is preferably admixed with a slag-forming compound and agglomerated to form pellets or the equivalent prior to reduction of the iron values. In this connection it has been discovered that, in general, the alkaline earth oxides or alkaline earth compounds which form alkaline earth oxides upon heating, and which have been employed heretofore as slag-forming agents in processes for smelting titaniferous ores such as ilmenite, are unsuitable in the present process since they do not impart the required low viscosity to the slag at the temperatures employed.

In the present process the slag-forming compound is a sodium compound, and while any sodium compound may be used which, under reducing conditions, will form sodium oxide, as for example, sodium hydroxide, sodium nitrate, etc., for economic reasons and ease of operation it has been found desirable to employ soda ash, mixtures of soda ash and sodium chloride, and especially sodium chloride alone.

Moreover to obtain a good reaction between the ilmenite ore and the slag-forming compounds, the ilmenite ore must have a relatively small grain size. When a loose mixture of ilmenite ore and a slag-forming compound are charged into a reduction furnace, such as a rotary kiln, there is a slight tendency for the charge to sinter at temperatures above 1100°. However, it has been found that if the ore and the slag-forming compound are agglomerated into small pellets before being charged into the rotary kiln, together with a carbonaceous reducing agent, no sintering will occur when operating the process within the preferred temperature range of 1150° C.–1200° C. The agglomeration of the ilmenite material and slag-forming compound may be carried out by any suitable method, one of which is more fully disclosed below.

In a preferred method for practicing the instant invention, the ilmenite ore or concentrate is first finely ground, preferably so as to pass through 65 mesh (Tyler Standard Screen Scale) to insure an intimate admixture of the ore with one or more finely divided sodium compounds used as a slagging compound. During grinding some gangue may be liberated which, if desired, may be removed by known methods such as simple washing or magnetic separation. After the ilmenite material and sodium compounds are thoroughly blended, the admixture is then agglomerated to form substantially spheroidal pellets in the range of from about 5–10 mm. in diameter. It is essential to the success of the subsequent reduction process that the size of the pellets be within the range indicated since if the pellets are too large they will require a relatively long reduction time. On the other hand, if the pellets are too small they will be subject to clogging and sintering in the reduction furnace at the temperatures used in carrying out the process. One method which may be used to form pellets of the requisite size is to moisten the admixture of finely ground ilmenite and slagging compound and tumble the admixture in suitable apparatus, such as a rotary drum. The moist pellets so formed will, as a rule, be sufficiently strong to permit direct feeding into a rotary reduction kiln together with a finely divided reduction agent such as coke fines. Nevertheless, it is to be appreciated that the mechanical strength of the pellets may be increased by baking the pellets prior to reduction, as for example by heating them to a temperature sufficient to drive off any free moisture in the pellets. Also, in some cases it may be desirable to remove as much sulphur as possible from the pellet mixture before reduction takes place in which case the moist pellets may be dried and baked in a blast roasting pot or in a continuous sintering machine such as the Dwight-Lloyd type. Moreover, certain of the $Na_2O$-forming compounds that may be used in the instant invention evolve considerable quantities of salt vapors which tend to settle out on certain parts of the reduction furnace and the charge therein and create operational difficulties, and therefore it may be desirable to bake the pellets prior to introduction into the reduction furnace so as to remove these salt vapors.

Following agglomeration of the admixture of ore and slagging compound the resulting pellets, either baked or unbaked, are then charged into a reduction furnace together with a finely divided solid carbonaceous reducing agent, preferably coke fines, and heated to a temperature between about 1150–1200° C., and preferably at about 1180° C. to reduce the iron values to metallic iron. The amount of coke fines used, should be sufficient to reduce all of the iron values in the ilmenite-containing material to metallic iron but preferably an excess of the finely divided reducing agent is employed. Also, it has proved advantageous to carry out the reduction in a rotary reduction kiln.

After the pellets have been reduced, they are removed from the furnace and cooled. Any excess unreacted reducing agent and the ash from the burnt reducing agent may then be readily separated and removed from the reduced pellets as, for example, by sifting. Similarly the unreacted reducing agent may be separated from the ash and recycled to the reduction furnace. The reduced pellets, which comprise metallic iron beads, a titanium rich residuum or concentrate and gangue, but which are substantially free of any reducing agent and ash are now crushed and ground to obtain an effective separation of the metallic iron beads from the titanium concentrate and gangue. Preferably the pellets are initially crushed to provide a material of relatively coarse particle size, i. e., about 60 mesh thereby to separate and remove some of gangue therefrom by magnetic separation. Thereafter, in order to liberate the metallic iron beads from the coarse gangue-free residuum or titanium concentrate it has been found necessary to crush the coarse titanium concentrate further, preferably in a ball mill, to a particle size of about 325 mesh (about 44 microns), which figure represents the average size of the metallic iron beads. After completion of the aforesaid grinding steps the metallic iron beads will be found to be liberated from the titanium concentrate from which they may be separated by magnetic and/or gravimetric methods to obtain (1) a metallic iron concentrate high in iron content and low in $TiO_2$ content and (2) a titanium concentrate high in $TiO_2$ content and low in iron. Any chromium and vanadium compounds which were originally present in the ilmenite-containing material will be found in the metallic iron concentrate where their presence is not harmful whereas they could only be considered as undesirable impurities if they appeared in the titanium oxide concentrate.

The particle size of the metallic iron beads which characterize the concentrate is about 44 microns and consequently the iron concentrate has the appearance of a fine powder. In this form the iron concentrate is not only somewhat inconvenient for use in commercial applications but also has a tendency to reoxidize and accordingly it is within the purview of the instant invention to treat the iron concentrate powder to preserve its quality and utility.

By way of example, the powdered iron concentrate may be agglomerated into pellets in a rotary drum in the presence of a small amount of moisture and subsequently subjected to a surface sintering operation under reducing or neutral conditions by heating the pellets in a blast roasting pot, covered with coke fines. Because of the small particle size of the iron, the surface of each pellet will easily sinter at temperatures as low as about 700°–800° C. to form an impervious integument which will serve to reduce the tendency of reoxidation of the metallic iron. The sintered iron pellets thus produced are well adapted for commercial applications e. g. in the production of steel or the like.

The titanium oxide rich residuum or concentrate obtained by the process of this invention may be used in its original state for the production of $TiCl_4$ by chlorination, or it may be further upgraded by leaching with a dilute acid, such as sufuric acid or hydrochloric acid. By such a leaching process any residual iron remaining in the titanium oxide concentrate, as well as other soluble impurities, are separated from the titanium oxide concentrate by removal in the acid solution and consequently the leached titanium oxide concentrate is a very pure, substantially iron-free material ideally suited for the production of titanium tetrachloride or titanium dioxide pigment. It has been found that by the process of the invention as high as 95.5% of the titanium dioxide values originally present in the ilmenite ore can be recovered in the titanium oxide concentrate.

The leached titanium oxide concentrate generally will be found to have a blue-black color due to the presence of trivalent titanium which is formed during reduction of the pelletized material. In order to obtain a titanium dioxide product which can be used as a technical grade $TiO_2$ or in the pigment industry, it is possible to calcine the leached titanium oxide concentrate under oxidizing conditions so that any trivalent titanium present in the concentrate will oxidize to tetravalent titanium. It has been found advantageous to add small amounts of an alkali during the calcination step and then leach the calcined product with water or dilute acid to produce a titanium dioxide which is suitable for technical purposes or in the pigment industry.

The following example, which is not to be construed as limitative of the invention, is set forth to illustrate more particularly the process of the instant invention.

Example 1

5 tons of an ilmenite concentrate having a particle size less than 20 mesh was ground in a ball mill to pass through a 65 mesh screen. During grinding 5% by weight of sodium chloride was added to the ilmenite concentrate to give an intimate mixture of the concentrate and the sodium chloride. The ilmenite concentrate had the following analysis: 44% $TiO_2$, 36% total iron (partly as FeO molecularly combined with $TiO_2$ and partly as magnetite and hematite), 0.25% sulphur and 5.6% gangue constituents.

The mixture of finely divided ilmenite and sodium chloride was rolled in a rotary drum in the presence of moisture to form pellets having a diameter of about 5 mm. and containing about 7% water. In order to remove as much sulphur as possible before reduction, the pellets were charged into a blast roasting pot to a depth of about 20 cm, and the charge was then heated and dried at the top while air was drawn through the charge from top to bottom. By combustion of the sulphur and oxidation of the iron to higher oxides, sufficient heat was developed to raise the temperature of the charge to about 800°–1000° C. A part of the sodium chloride in the pellets evaporated and was drawn out with the combustion gases. The roasted pellets were dry, hard and strong.

The hard pellets were then fed into a rotary kiln together with approximately 75% excess of coke fines, based on the weight of the pellets introduced into the furnace. The mixture was heated to 1180° C. and maintained at this temperature for sufficient time to reduce substantially all of the iron values to metallic iron. After removing the reduced pellets from the furnace and cooling, excess coke was separated from the reduced pellets and recovered for subsequent use in the reduction kiln. Coincident with recovery of excess coke, the ashes from the burnt coke were also removed. Analysis of the reduced pellets showed that they contained 48.7% $TiO_2$, 41.6% total iron of which 38% was metallic iron, which corresponds to a degree of reduction of the iron values to metallic iron of about 91%.

The reduced pellets were ground in a ball mill to about 325 mesh and after magnetic separation of the ground material the following materials were obtained:

|  | Iron Concentrate | Titanium Oxide Concentrates—Fractions | | | |
|---|---|---|---|---|---|
|  |  | I | II | III | Average |
|  | Percent | Percent | Percent | Percent | Percent |
| Weight | 36.2 | 42.1 | 17.2 | 4.5 | 63.8 |
| $TiO_2$ | 4 | 81.0 | 68.3 | 27.1 | 73.7 |
| Total Fe | 90.5 | 6 |  |  |  |
| Metallic Fe | 80 | 0 |  |  |  |

Experiments show that the products obtained in fraction II and III above may be treated again by the method of the instant invention to obtain an iron concentrate and a $TiO_2$ concentrate similar to that shown under fraction I above. If desired, however, fractions II and III may be blended with raw ilmenite-containing material for use in a subsequent reduction process.

The titanium-rich concentrate (fraction I) which contained 81.0% $TiO_2$ was further concentrated by leaching in 5–10% sulfuric acid to obtain a product analyzing 87.1% $TiO_2$ and 0.9% Fe. The leached 87.1% $TiO_2$ concentrate had a blue-black color due to the presence of trivalent titanium values formed during the reduction step. By heating the leached concentrate to incandescence, the reduced titanium values were oxidized to $TiO_2$ and a yellow-white product was obtained. During heating 2% alkali was added and the yellow-white product was then leached with 5% hydrochloric acid to obtain a $TiO_2$ product which could be used for technical purposes and in the pigment industry.

The 90.5% iron concentrate having the consistency of a fine powder was agglomerated by rolling it in a rotary drum in the presence of water to form pellets. The moist pellets were then placed in a blast roasting pot to a depth of about 10 cm. and covered with coke fines. The coke layer was ignited by means of an oil flame and the heat from the coke layer was transferred to the pellets while at the same time a gentle air current was drawn down through the charge. No oxidation of the metallic iron in the pellets was observed and the surface of the fine grain metallic iron products sintered at about 700–800° C. to form a hard and essentially impervious metallic integument. The sintered metallic iron pellets had a specific weight of about 5 and were well suited for smelting in a steel furnace.

The preceding description and example clearly illustrate that the present invention provides a valuable method for recovering high grade metallic iron and a substantially pure $TiO_2$ concentrate from ilmenite-containing materials. Also, it has been demonstrated that the instant invention provides a simple and improved method for treatment of ilmenite-containing materials and that such method is economical to employ. Not only does the instant process produce a titanium dioxide concentrate which is readily adaptable to the production of titanium tetrachloride and other titanium compounds which are useful for technical purposes and in the pigment industry, but it also produces a metallic iron concentrate which may be subsequently employed in a profitable manner in the production of steel or the like.

While the invention has been described and illustrated by the example, it is not intended to be strictly limited thereto and other modifications and variations may be employed within the scope of the following claims.

I claim:

1. A process for treating an ilmenite-containing material to produce a titanium oxide concentrate and a metallic iron concentrate which comprises: admixing said ilmenite-containing material with a sodium compound which upon heating in a reducing atmosphere will form sodium oxide, aggregating the admixture to form substantially spheroidal pellets, the diameter of said pellets being in the range of from 5 to 10 mm., heating said pellets in the presence of a finely divided carbonaceous reducing agent to a temperature within the range of from about 1150° to 1200° C. for a period of time sufficient to reduce substantially all of the iron values in said pellets to metallic iron in the form of fine beads, comminuting the reduced pellets to form a finely divided material having a particle size of the order of about 325 mesh, and then separating the finely divided material into a titanium oxide concentrate and a metallic iron concentrate.

2. Process according to claim 1 wherein the pellets are heated to a temperature of about 1180° C.

3. Process according to claim 1 wherein the ilmenite-containing material is admixed with about 3% soda ash.

4. Process according to claim 1 wherein the ilmenite-containing material is admixed with about 3-5% of a mixture comprising soda ash and sodium chloride.

5. Process according to claim 1 wherein the ilmenite-containing material is admixed with about 5% sodium chloride.

6. Process according to claim 1 wherein the finely divided reduced material is separated into a titanium oxide concentrate and metallic iron concentrate by a magnetic separation operation.

7. Process according to claim 1 wherein the finely divided reduced material is separated into a titanium oxide concentrate and metallic iron concentrate by a gravimetric separation operation.

8. Process according to claim 1 wherein the pellets formed from said admixture are sintered at a temperature between about 800° and 1000° C. prior to heating said pellets at a temperature within the range from about 1150° to 1200° C.

9. A process for treating an ilmenite-containing material to produce a titanium oxide concentrate and a metallic iron concentrate which comprises: admixing said ilmenite-containing material with a sodium compound which upon heating in a reducing atmosphere will form sodium oxide, aggregating the admixture to form substantially spheroidal pellets, the diameter of said pellets being in the range of from 5-10 mm., heating said pellets in the presence of finely divided coke to a temperature within the range from about 1150° to 1200° C. for a period of time sufficient to reduce substantially all of the iron values in said pellets to metallic iron in the form of fine beads, cooling and separating the reduced pellets from excess coke and burnt coke ash, grinding the reduced pellets to form a finely divided material having a particle size of the order of about 325 mesh, and then separating said finely divided material into a titanium oxide concentrate and metallic iron concentrate.

References Cited in the file of this patent

UNITED STATES PATENTS

| | | |
|---|---|---|
| 1,717,160 | Kichline | June 11, 1929 |
| 1,902,203 | Bichowsky | Mar. 21, 1933 |
| 2,238,673 | Asak | Apr. 15, 1941 |